BEST AVAILABLE COPY T. 857,036

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 20 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

856 O.G. 697

724,608

HYDRAZIDES HAVING AT LEAST ONE NAPHTHALENE NUCLEUS AND THEIR USE IN POLYOLEFINS

James M. Straley and David J. Wallace, both of P.O. Box 511, Kingsport, Tenn. 37662

Filed Apr. 26, 1968. Published Dec. 17, 1968
Class 260—45.9
No Drawing. 20 Pages Specification Hydrazide compounds defined by the general formula

A—CONHN=CH—B wherein A and B independently represent an ortho-hydroxyphenyl group or an ortho-hydroxynaphthyl group, at least one of A or B being an ortho-hydroxynaphthyl group. The hydrazide compounds are blended with polyolefin polymers to stabilize said polymers against the accelerated degradation effects of copper. The hydrazide compounds can be used in combination with other known polyolefin stabilizers, e.g., phenolic antioxidants.